United States Patent [19]

Deckler

[11] Patent Number: 5,058,766

[45] Date of Patent: Oct. 22, 1991

[54] SEED METER FOR ROW CROP PLANTER UNIT

[75] Inventor: Harry C. Deckler, Williamsburg, Iowa

[73] Assignee: Kinze Manufacturing, Inc., Williamsburg, Iowa

[21] Appl. No.: 528,760

[22] Filed: May 25, 1990

[51] Int. Cl.[5] .............................................. A01C 7/00
[52] U.S. Cl. .................................. 221/254; 221/263; 221/185; 221/251; 111/77; 111/184
[58] Field of Search ............... 221/263, 265, 266, 185, 221/160, 162, 167, 277, 251, 254; 222/352, 368, 370; 111/34, 77, 78, 184

[56] References Cited

U.S. PATENT DOCUMENTS

| | | |
|---|---|---|
| 3,347,426 | 10/1967 | Morrison, Jr. et al. . |
| 3,628,694 | 12/1971 | Nichols .......................... 221/265 |
| 3,715,057 | 2/1973 | Becker . |
| 3,749,035 | 7/1973 | Cayton et al. . |
| 3,888,387 | 6/1975 | Deckler . |
| 3,982,670 | 9/1976 | Brass . |
| 3,999,690 | 12/1976 | Deckler . |
| 4,047,638 | 9/1977 | Harrer et al. . |
| 4,074,830 | 2/1978 | Adams et al. . |
| 4,091,964 | 5/1978 | Harrer . |
| 4,162,744 | 7/1979 | Barker et al. . |
| 4,450,979 | 5/1984 | Deckler . |
| 4,508,243 | 4/1985 | Deutsch et al. . |
| 4,600,122 | 7/1986 | Lundie et al. . |
| 4,613,056 | 9/1986 | Olson . |
| 4,664,290 | 5/1987 | Martin et al. . |
| 4,793,511 | 12/1988 | Ankum et al. . |
| 4,924,786 | 5/1990 | Keetox .......................... 111/184 |

FOREIGN PATENT DOCUMENTS 1012815  2/1950  France .

Primary Examiner—H. Grant Skaggs
Attorney, Agent, or Firm—Emrich & Dithmar

[57] ABSTRACT

A seed meter for a row crop planter unit having a seed disc rotating in a vertical plane includes improvements for seating individual seeds in seed cells on the periphery of the seed disc as the seed disc rotates through the seed reservoir. The improvements also include a barrier brush for preventing seeds from entering the delivery tube directly from the reservoir, and a brush holder which limits the effective width of a peripheral retainer brush so that the retainer brush cannot retain two seeds simultaneously in the same seed cell.

13 Claims, 3 Drawing Sheets

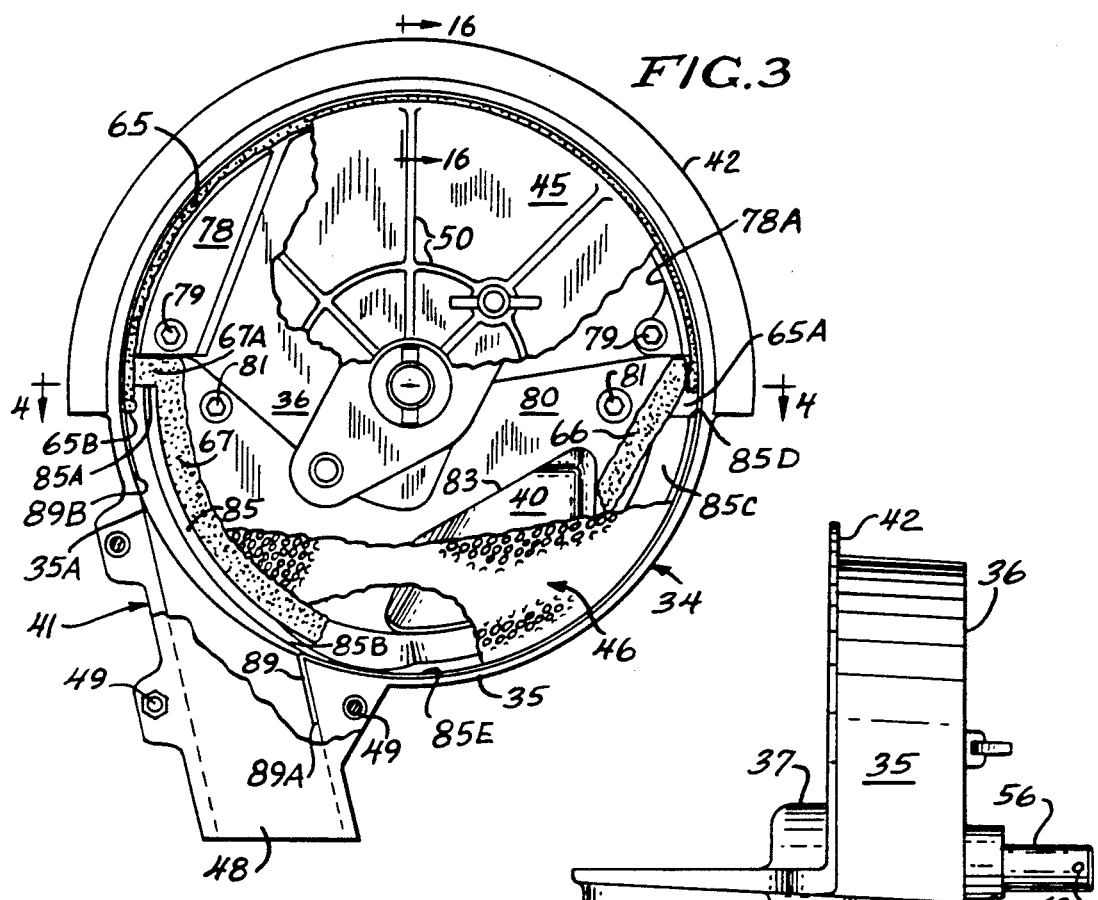
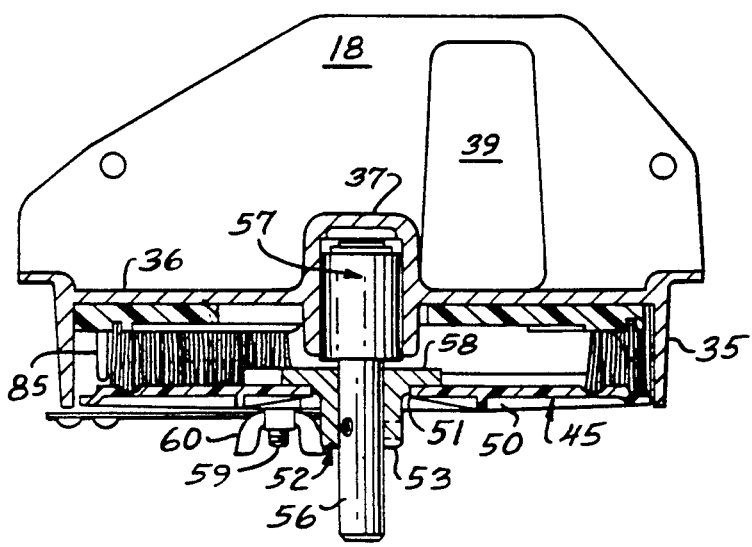

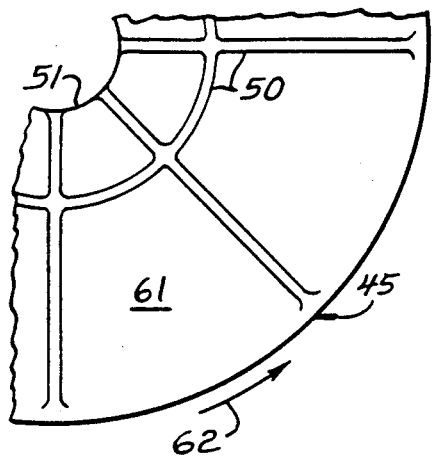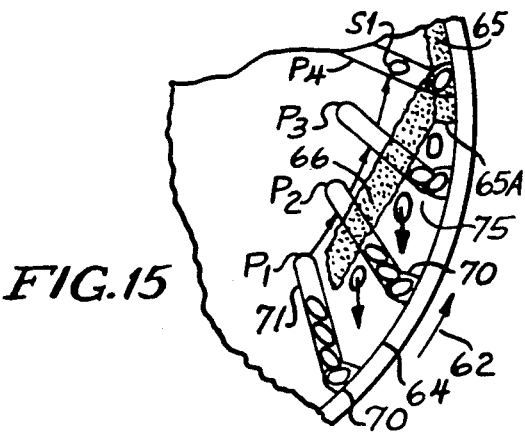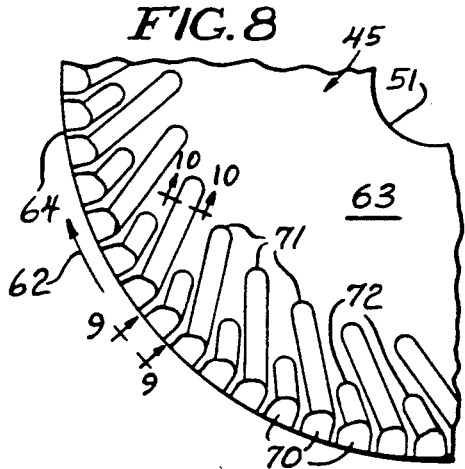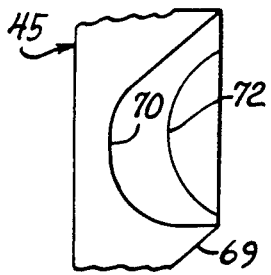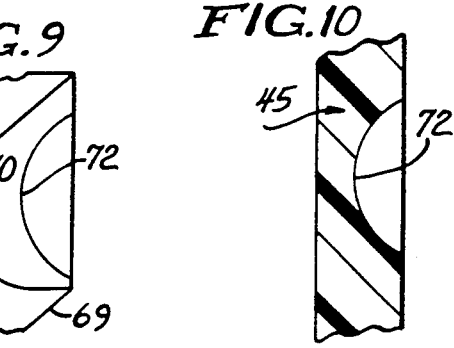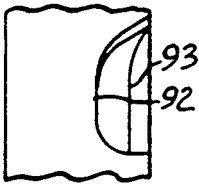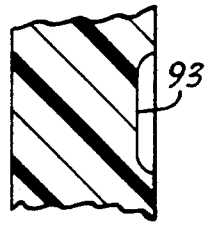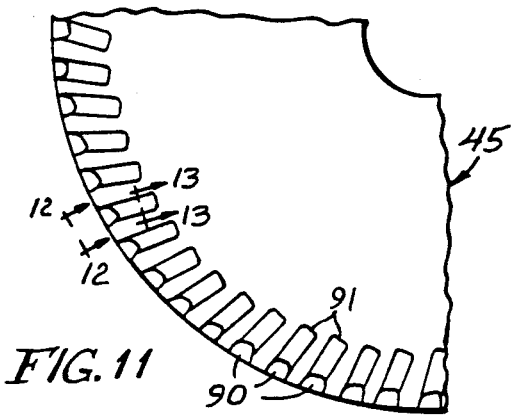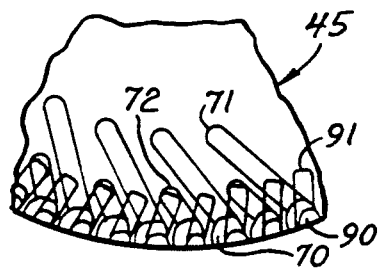

SEED METER FOR ROW CROP PLANTER UNIT

FIELD OF THE INVENTION

The present invention relates to a seed meter for an agricultural row crop planter unit. More particularly, it relates to improvements in a seed meter wherein a seed disc rotates in a vertical plane and has a plurality of seed cells formed on its periphery.

BACKGROUND OF THE INVENTION

Row units for agricultural planters having seed meters using discs or plates rotating in a vertical plane have long been known and used. Some meters have used mechanical finger pick-ups for grasping seeds as the finger passes through a reservoir of seeds. The fingers are cammed open as the finger approaches the reservoir and then released as the finger enters the seed reservoir so that the finger exerts a holding or gripping force on the seed as it leaves the reservoir. The fingers are then cammed open once more as the finger moves adjacent a discharge aperture so that the seed is released and discharged under centrifugal force to a seed tube for depositing in a seed furrow.

Seed meters for this type are also known wherein the seed selection and isolating means includes a disc rotating in a vertical plane having individual seed cells formed in the periphery of the disc and opening laterally outwardly for radial discharge of the seed.

In one such system in which the seeds are held in the disc by application of an air pressure differential, namely, in the Deckler U.S. Pat. No. 4,450,979, a retainer brush is used for retaining the seeds in their respective seed cells for at least a portion of the angular trajectory of the seed cells. In a more recent improvement, a retention brush is employed for retaining the seeds in their respective seed cells in a non-pneumatic planter. The retention brush extends continuously about the periphery of the disc from a location where the disc exits the seed reservoir to the discharge opening. Such a meter is disclosed in Keeton application Ser. No. 366,006 entitled "Seed Dispenser With Dual Based Seed Plate", filed June 14, 1989, and now U.S. Pat. No. 4,924,786.

As a practical matter, there is a need to improve the reliability of these seed meters particularly at higher operating speeds, and in the past, the most prevalent error has been caused by "skipping"—i.e., failing to seat seeds in all of the individual seed cells. The problem of skipping is exacerbated as the angular velocity of the disc increases. It is desirable, of course, to increase the operating speed of the disc because the operating speed of the planter is limited, as a practical matter, by the speed of the disc since the disc is driven by a ground-engaging pick-up wheel mounted to the planter and the population (i.e., the spacing of seeds in a row) remains constant even though operating speed may vary. It is thus desirable to enhance the accuracy and reliability of the meter while permitting the planter to operate at higher speeds.

Moreover, the problem of reliable operation at higher speeds is complicated by the fact that different seeds have different sizes, shapes, and masses. Adapting the planter to plant a different crop is not simply a matter of substituting seed plates having identical configurations but simply scaled to a different seed size. Not only are the physical dimensions and shapes of different seeds (such as hybrid corn, soybean milo and sorghum) different but what appears to be of even more concern at high speeds is that the mass of these seeds is different. It will be appreciated that as a seed disc enters a seed reservoir, the seeds are at rest whereas the edge of the disc is traveling at a considerable velocity (which may be as high as 4.5 feet per second). In order to be accurate, the seed disc must engage the seed at rest and bring it up to the speed of the disc over a very short distance, of the order of 4-5 inches. This has presented a considerable problem for engineers in the past, particularly for the varying characteristics of the different types of seeds mentioned.

SUMMARY OF THE INVENTION

The present invention addresses the problem of ensuring reliable seating of individual seeds in substantially every seed cell of a rotary disc planter by providing lead-in or "agitation" grooves for each cell which engage the seeds. During normal operation, a plurality of seeds are partially seated in the grooves before the seed cell leaves the seed reservoir. Thus, the lead-in grooves bring at least some of the seeds in the reservoir up to the speed of the disc before the seed cell leaves the reservoir.

The seed cells are located at the outer or "distal" ends of the lead-in grooves, on the periphery of the disc. At the bottom of the reservoir is an insert which provides the bottom wall of the seed reservoir area. That bottom wall is inclined downwardly and toward the disc to assist seeds to move toward the disc under gravity and under the weight of the seeds above. The lower edge of the insert immediately adjacent the disc is spaced from the disc by a distance (called a "loading space") sufficient to permit a seed to partially enter the loading space where the disc enters the seed reservoir. The insert edge is formed closer to the disc in the direction of disc rotation, thus progressively narrowing the loading space in the direction of rotation of the disc to assist in urging one seed into the cells.

An isolation brush is disposed adjacent the seed cells as they leave the reservoir and it cooperates with the side wall of the housing to provide a continuously narrowed space for the seeds in the lead-in grooves. If the seed cell is empty, the isolation brush urges seeds in the lead-in groove to be seated firmly into an associated seed cell. If the seed cell, on the other hand, is full then the extra seeds in the lead-in groove may pass beneath the isolation brush. The width of the seed retention brush (which begins as the seed cells pass the isolation brush) is controlled by the upper brush retainer so that it has an effective width no larger than the width of a seed cell. Thus, any seeds that are swept past the isolation brush by the lead-in grooves are free to fall by gravity to the seed reservoir so that when a seed cell leaves the reservoir any seeds in the lead-in grooves are free to fall out and return to the reservoir under gravity. Thus, it is ensured that one and only one seed is seated in the cell.

After leaving the reservoir, the disc rotates so that the seed seated in the cell is retained by the peripheral retention brush until the seed reaches the discharge opening where it is free to move under centrifugal force outwardly of the seed cell and into the discharge chute for being deposited in a seed furrow.

Other features and advantages of the present invention, such as the provision of a barrier brush for at least partially defining a reservoir of seeds and preventing their accidental discharge into the discharge chute are disclosed, and will b understood by those skilled in the art from the following detailed description accompanied by the attached drawing wherein identical reference numerals refer to like parts in the various views.

BRIEF DESCRIPTION OF THE DRAWING

FIG. 3 is a left side elevational view of the seed meter with portions of the seed plate and cover plate broken away to illustrate the interior;

FIG. 4 is a horizontal cross-sectional view of the housing of FIG. 3 taken through the sight line 4—4;

FIG. 6 is a front view of the seed meter of FIG. 3 with the lower portion of the housing broken away;

FIG. 7 is a fragmentary view of the seed disc showing the exterior of the lower right quadrant thereof, when viewed from the left side of the meter;

FIG. 8 is a view of the interior of the seed disc showing the other side of the portion shown in FIG. 6;

FIG. 9 is an end view of the disc of FIG. 8 taken along the sight line 9—9 thereof;

FIG. 10 is a cross-sectional view of a longer lead-in groove of the seed disc of FIG. 8 taken along the sight line 10—10;

FIG. 11 is a view similar to FIG. 8 for an alternative seed disc adapted for metering smaller seeds;

FIG. 12 is a fragmentary end view of the disc of FIG. 11 taken along the sight line 12—12 thereof;

FIG. 13 is a fragmentary cross-sectional view of a lead-in groove for the seed disc of FIG. 11 taken along the sight line 13—13 thereof;

FIG. 14 is a fragmentary view of the seed discs of FIGS. 8 and 11 respectively superimposed on one another to illustrate the differences in the agitation grooves of the respective discs;

FIG. 15 is a close-up fragmentary view of the seed disc, isolation brush and retainer brush as the seed cells leave the reservoir.

DETAILED DESCRIPTION OF A PREFERRED EMBODIMENT

Figure 1:
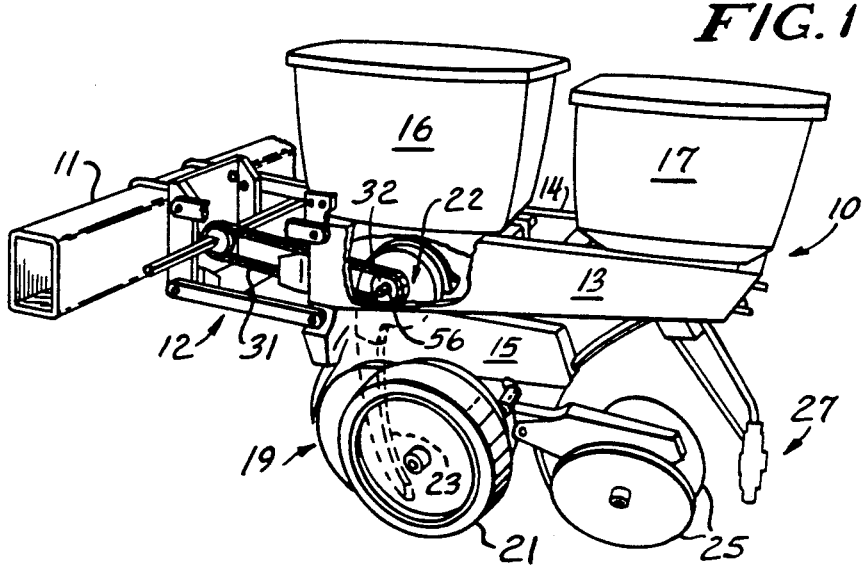
FIG. 1 is a perspective view taken from the left side and toward the rear of a row crop planter unit, with a portion of the frame broken away to show the seed meter.

Referring first to FIG. 1, reference numeral 10 generally designates a planter row unit mounted to a horizontal frame member 11 which may be part of a wheel-supported planter frame or toolbar. The forward portion of the row unit 10 is mounted to the frame member 11 by means of a conventional four-bar parallel linkage generally designated 12 so that each individual row unit is free to adjust vertically relative to the planter frame to accommodate variations in ground contour. The linkage 12 is connected to the frame of the planter row unit which includes first and second side panels 13, 14 and a lower frame portion 15.

The side panels 13, 14 carry a seed hopper 16 mounted above the frame and in a forward position, and a rear hopper 17 for storing chemicals, such as herbicides.

Mounted to the lower frame portion 15 of the row unit is a disc furrow opener generally designated 19 including a pair of discs for opening a seed furrow as the planter row unit is pulled forward (that is, to the left in FIG. 1). A pair of gauge wheels, one of which is shown in FIG. 1 and designated 21 cooperate with the disc opener 19 to form the furrow as seeds are selected or "singulated" by means of a seed meter generally designated 22 and deposited in a seed tube 23 extending between the discs of the opener 20 and the gauge wheels.

Behind the gauge wheels 21 are a pair of angled closing wheels 25 for closing the furrow after the seed is deposited. Following the closing wheels 25, there is a dispenser generally designated 27 for applying, according to the farmer's requirements, a herbicide or insecticide from the rear hopper 17.

The drive for the seed meter 22 is provided by a conventional transmission which is driven by a pick-up wheel mounted to the frame (not shown for brevity). A transverse shaft 30 of the transmission drives a chain 31 which, in turn, drives a sprocket and disengageable jaw clutch 32 mounted to side panel 13. The jaw clutch engages the shaft 56 of the seed meter 22.

Figure 2:
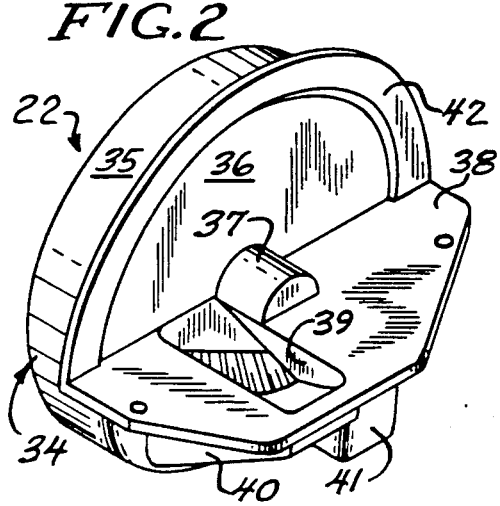
FIG. 2 is a perspective view of a seed meter incorporating the improvements of the present invention taken from the upper right rear of the meter.

Turning now to FIG. 2, there is shown an upper, right rear perspective view of the seed meter 22. The meter 22 includes a cast metal housing generally designated 34 which includes a cylindrical side wall 35, a generally flat rear wall 36 which defines a bearing housing 37, and a horizontal flat mounting flange 38. The flange 38 is mounted to the bottom wall of the seed hopper 16 and supported on the frame of the planter unit. The mounting flange 38 defines a seed inlet opening 39 which registers with a corresponding opening in the bottom of the seed hopper 16 so that seed falls under gravity into the bottom of the housing 22, guided by an inclined chute designated 40 which is also formed as a part of the housing 22. The housing 22 also provides a discharge chute 41 which receives the seed tube 23 which guides the seed into the furrow formed by the discs 19.

The housing 34 also provides a vertical flange 42 which extends partially about the periphery of the side wall 35 and extends beyond the side wall. The circular flange 42 engages a formed side wall adjacent the bottom of the seed hopper for stabilizing the mounting of the seed meter to the hopper.

Turning now to FIGS. 3–6, reference numeral 45 generally designates a seed disc which picks up individual seeds from a reservoir generally designated 46 at the bottom of the meter housing (see FIGS. 3 and 6), and delivers the seeds to the discharge chute 41. A cover plate 48 is secured to the discharge chute 41 by bolts at 49.

The quantity of seeds in the reservoir 46 is formed by seeds being deposited under gravity, as mentioned, from the seed hopper 16, through the opening 39 in the horizontal mounting flange 38 of the housing (FIG. 4) and guided by the lead-in chute 40. As seen in FIG. 3, the seed disc 45 rotates in a counterclockwise direction. The disc 45 has a generally flat outer surface and may be ribbed for strength, as illustrated at 50 in the drawing.

The center of the seed disc defines an opening 51 in which a disc mounting member 52 is received. The mounting member 52 includes a neck portion 53 which extends through the aperture 51 of the seed disc and defines a central opening for receiving a shaft 56 of a bearing generally designated 57. The bearing 57 is pressed into the bearing housing 37 of the meter housing.

The disc mount member 52 also includes a rear mounting flange 58 having a pair of outwardly extending studs 59 on which wing nuts 60 are received to secure the seed disc to the shaft 56 which the previously described sprocket and clutch assembly 32 engages (FIG. 1). Although not seen in FIG. 4, the sprocket 32 is driven by the drive chain 31 through a conventional clutch drive shaft 56 by a roll pin received in aperture 62 in shaft 56 (FIG. 6).

Referring now particularly to FIG. 3, there are three brush assemblies or, simply, brushes located within the housing 34 of the seed meter. Specifically, there is a seed retention brush 65, a seed isolator brush 66, and a barrier brush 67. The isolator brush and barrier brush, and their cooperation with the retention brush form important elements of the instant invention. In order to understand the structure and functioning of these brushes, it is necessary first to understand the structure and operation of the seed disc. Turning, then, to FIGS. 6 and 7, FIG. 7 shows the exterior side of the seed disc 45 which consists primarily of a flat outer surface 61 and the strengthening ribs 50. The exterior surface of the seed disc 45 is non-functional. FIG. 7 shows the lower right-hand quadrature of the disc, but the other quadratures of the disc are similar, and it will be appreciated that during operation, the disc is rotated in the direction of the arrow 62 in FIG. 7.

Turning now to FIG. 8, the interior surface of the seed disc 45 also includes a flat surface 63 and a peripheral edge designated 64 which is a circle centered on the center of the aperture 51 which is also the axis of rotation of the disc. Along the periphery of the disc 45 are a plurality of individual seed cells designated 70. Each of the cells 70 is sized according to the seed for which the disc is designed to singulate and dispense. The seed cells open outwardly into the peripheral edge 64 so that seeds are delivered radially outwardly under centrifugal force, as will be further described below.

Leading into each of the seed cells 70, and formed in the inner surface 63 of the disc 45, is a generally linearly elongated groove referred to as a lead-in or agitation groove. For the soybean disc shown in FIG. 8, there are two lengths of lead-in groove, longer grooves such as those designated 71, and shorter grooves designated 72. It will be appreciated that as viewed in FIG. 8, the disc 45 rotates in a clockwise direction, so that the agitation grooves 71, 72 extend from their associated seed cells 70 in an upstream direction, as can best be appreciated from FIG. 15 which is a diagrammatic illustration taken from the outside, as FIG. 7, showing the seed cells 70 and only the longer agitation grooves 71, which are designated respectively P1, P2, P3 and P4.

Referring now to FIG. 9, which is an edge view looking into one of the seed cells 70 along the sight line 9—9 of FIG. 8, it can be seen that the cell 70 is open at the edge 69 of the disc, and the lower surface of the seed cells 70 is curved to accommodate a seed. The seed cells are formed more deeply into the disc than is the rounded surface of the lead-in or agitation grooves 71 and 72.

As the lead-in grooves move counterclockwise (as viewed in FIGS. 3 and 7) they pass through the reservoir of seeds 46, thereby agitating the seeds in the reservoir and causing the seeds engaged by the grooves 71, 72 to impart a motion to the seeds which they engage. In other words, one function of the grooves 71, 72 is to bring the seeds in the reservoir which are located immediately adjacent and contact the interior surface of the seed disc 45 up to the speed of the disc itself until individual seeds become at least partially seated in the grooves and are traveling at the velocity of the disc. It must be remembered that the angular velocity of the disc is quite high whereas the seeds, at least when they are initially deposited in the reservoir 46 are near rest. Therefore, a primary function of the agitation grooves is to bring the seeds closest to the inner surface of the disc up to the speed of the disc.

The length of the agitation grooves is such that one or more seeds will eventually become seated in the grooves. Because the depth of the grooves is less than approximately half the bulk of an average seed. The seeds are not permanently lodged in the groove, and it is necessary to isolate only a single seed captured by a groove and to force it into the seed cell. This is accomplished in the soybean disc by the direction of the seed grooves (that is, the seed grooves extend from an outermost point adjacent the seed cell, thence inwardly and upstream of the direction of travel) so that seeds trapped on an inner portion of a groove will tend to be moved outwardly toward a seed cell.

Moreover, when viewing FIG. 15, as the grooves approach the isolation brush 66, it will be appreciated that the isolation brush is angled from an inward position to a position adjacent the peripheral edge 64 of the seed disc in the direction of movement of the disc. This creates a narrowing passage represented by the arrow 75 in FIG. 15 in which seeds are urged outwardly toward the seed cells if the seed cell is empty. However, if a seed cell is occupied by a seed and there are also seeds lodged in an associated lead-in groove, such seeds may pass beneath the isolation brush 66. Such seeds which pass the isolation brush 66 are free to fall back to the reservoir under gravity unless they are held in a seed cell by the retainer brush 65, as will be described. The length of the shorter agitation grooves 72 is limited not by function but by the fact that the grooves cannot be extended without running into adjacent longer grooves, as will be observed from FIG. 8 by projecting the shorter grooves. Nevertheless, the shorter grooves do perform both of the functions of the agitation grooves indicated above for the longer grooves.

This action can be appreciated by observing the progress of the larger grooves traveling from the position of P1 in FIG. 15, for example, to the next progressive position of P2 wherein the innermost seed is knocked out of the groove. Similarly, as the agitation groove proceeds to the position P3 in FIG. 15 another excess seed is knocked out of the groove because there is already a seed seated in the seed cell associated with that groove, and the action proceeds until a single seed is isolated and lodged within the associated seed cell, as illustrated by the position of the groove P4 in FIG. 15. At this time, the seed cell passes beneath the leading edge 65A of the retention brush 65. Referring to seed S1 in groove P4, that seed passed beneath the isolator brush 66 but is inboard of the retention brush 65, so it is not held at all and will fall back to the reservoir under gravity.

The function of the retention brush, as known in the art, is to retain the seed in its associated cell 70 from the time the seed cell leaves the reservoir of seeds until it reaches the discharge aperture which can best be appreciated from FIG. 3, the downstream edge of the retention brush 65 being designated 65B in FIG. 3. After the seed cell passes the downstream end 65B of the retention brush, the seed is free to move, and as the disc continues to rotate at high speed, centrifugal force forces the seed outwardly of the cell and into the discharge chute 41. It will also be appreciated that the inner surface of the side wall 35 of the housing cooperates with the seed cell and the retention brush 65 to retain the seeds in their cells, and that the cooperating interior surface of the side wall 35 ends at approximately the location designated 35A in FIG. 3 so that the seeds are free to migrate radially outwardly under centrifugal force as the disc continues to rotate.

Figure 16:
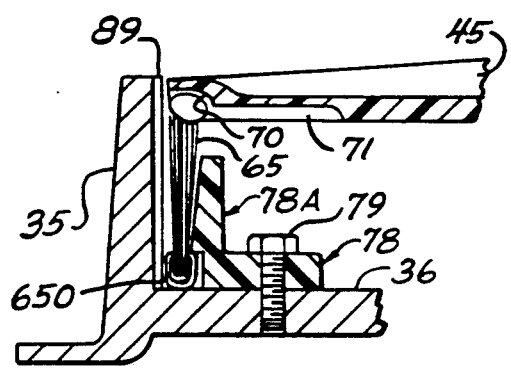
FIG. 16 is a cross sectional view of the housing, disc and retainer brush taken along a radial plane of the meter, 16—16 of FIG. 3.

Returning now to FIG. 3, the retention brush 65 is an elongated brush which extends continuously from approximately the 3 o'clock position designated 65A in FIG. 3 to approximately the 9 o'clock position designated 65B. The retention brush has more supple or flexible bristles which bend over slightly as they engage the interior surface of the seed disc. Turning to FIG. 16, the illustrated retention brush 65 has a continuous strip or backing 65D which is retained against the back plate 36 and secured in place by means of an upper brush holder designated 78 in FIG. 3 which is bolted to the back plate 36 by bolts 79. The upper brush holder 78 includes a section 78A spaced from the wear strip 89, in cooperation with the inner surface which is supported by 35 to form a channel or groove which controls the width of the seed retaining brush 65 at the point where the retainer brush contacts the seeds that are retained in the pockets 70. In other words, the distal end of the bristles of the retainer brush as prevented from spreading out and retaining seed in the lead-in grooves 71.

Referring now to FIGS. 3 and 4, the isolation brush 66 and barrier brush 67 are formed of individual tufts of bristles held in receptacles formed in a lower brush holder or insert generally designated 80 which is secured to the back plate 36 of the housing by bolts 81. An opening 83 is formed in the lower brush holder 80 to communicate the lead-in chute 40 with the reservoir 46 of seeds to maintain a continuous supply of seeds and a generally constant level of seeds within the reservoir. The brush holder 80 may be formed of any suitable plastic or nylon material. The bristles on the isolation brushes 66 and barrier brush 67 are stiffer than those of the retention brush 65 because the function of the former two brushes is to engage, direct and even remove seeds from the lead-in grooves, rather than simply to retain the seeds in their pockets.

Formed in the lower left portion of the lower brush holder 80 is a rigid retention wall 85 (FIGS. 3-5) which extends from a location just upstream of the edge 65B of the retention brush (at which location the seeds are no longer positively retained in their cells) to a location 85B just beyond the downstream edge of the discharge chute 41. The barrier brush 67 is formed radially outwardly at 67A beyond the upstream end 85A of the rigid retainer wall 85 and outwardly to engage the inner edge of the retention brush 65. The barrier brush extends downwardly and around the periphery of the disc adjacent the inner surface of the retainer wall 85 to the location 85B. The barrier brush 67 prevents seed from passing between the disc and the top of the rigid retention wall and inadvertently entering the discharge conduit 41. In this manner, the distal ends of the bristles of the barrier brush 67 engage the inner surface of the rotating disc and create little or no friction, and the more rigid outer edge of the retention wall 85 may have a greater clearance relative to the inner surface of the rotating disc and need not engage that surface which would cause wear and perhaps damage the disc. In brief, the function of the barrier brush 67 is to permit a greater clearance between the outer edge of the barrier wall 85 and the rotating disc while preventing seeds in the reservoir from entering into the discharge chute.

A wear strip 89 extends about the inner surface of sidewall 35 from a position 89A (FIG. 3) at the downstream edge at the inlet opening of the discharge chute 41 to a position 89B just beyond where the seed is free to enter the discharge chute. The wear strip 89 is replaceable and protects the more costly metering housing from the abrasive effects of some types of seed and allows the farmer to rebuild the meter to like-new condition with relatively low cost parts.

Referring now to FIGS. 3-6, the rigid retention wall 85 of the lower brush holder 80 terminates at 85B (see FIGS. 3 and 5) and a section 85C of reduced extension continues from that location over to a location identified at 85D in FIG. 3 just before a captured seed enters beneath the leading edge 65A of the retainer brush 65. As best seen in FIG. 6, the angle of the surface of the wall section 85C is inclined downwardly and outwardly of the lead-in chute 40, and the inclined surface of the lower wall portion 85C at least partially defines the bottom of the reservoir, thereby assisting the seeds to migrate under gravity outwardly and downwardly toward the seed cells of the disc 45.

Figure 5:
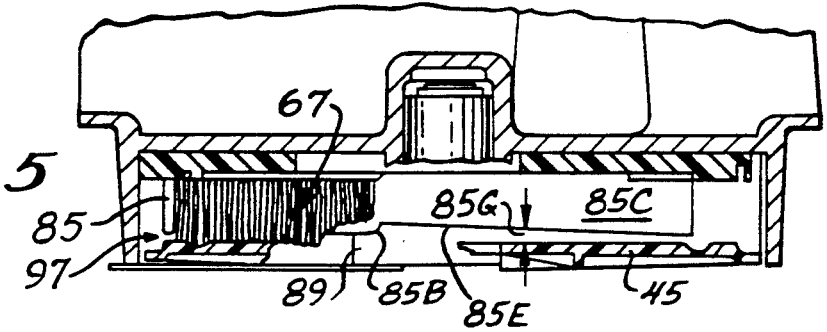
FIG. 5 is a fragmentary view similar to FIG. 4 but with portions of the bearing and disc mount removed to show more clearly the loading space at the base of the seed reservoir.

As seen best in FIGS. 5 and 6, the outermost edge of the inclined wall section 85C is designated 85E; and it is spaced further from the disc 45 adjacent the upstream end 85B of the rigid retainer wall and extends progressively closer to the disc 45 as the lower wall section 85C approaches the retainer brush and the end 85D of the lower wall section. Thus, there is a space (seen best at 85G in FIG. 5) between the edge 85E of brush holder insert and the disc in which seeds may fall down to the peripheral of the disc and into the seed cell. As the disc rotates and these seeds are brought up to speed, the progressive encroachment of the edge 85E (which also gains in thickness as one proceeds from the 6 o'clock position to the 3 o'clock position as viewed in FIG. 3) urges the seed into full seating engagement with an associated cell 70. This space (i.e., 85G) between the edge 85E of the brush holder insert and the inner surface of the disc is referred to as a "pinch" or "loading" space.

Turning now to FIGS. 11, 12 and 13, there is shown an arrangement for a seed disc for a smaller seed such as milo or sorghum. In this case, there is an equal number of seed cells designated 90 on the periphery of the disc 45, and each cell has associated with it a lead-in or agitation groove 91. However, in this case, the seed cells 90 are much shallower (such as indicated at 92 in FIG. 11), and the lead-in grooves are also more shallow as indicated at 93 in FIGS. 11 and 12. Moreover, in the case of the smaller seeds, it is not necessary that the action of the agitation grooves be as aggressive as for larger seeds, so the inclination of the lead-in grooves 91 is that they are oriented downstream, when proceeding away from the seed cells 90 as distinguished from the agitation grooves 71, 72 for the larger seeds as illustrated in FIG. 8.

The reverse orientation of the agitation groove 91 on the disc for small seeds helps avoid doublets of seeds. It will be recalled that the retention brush width is controlled so as to retain only one seed when larger discs and seeds are used but when small seeds such as milo are used a second or extra seed could possibly be carried along with the primary or desired single seed. Thus, the rearward or "downstream" angle of the agitation groove 91, assisted by gravity and the action of the retention brush 65, urge any extra seeds trapped between the disc 45 and the retention brush 65 to 65A to move inwardly toward the center of the disc and become free to fall to the reservoir 46 during the time the pocket and agitation groove pass from the 3 o'clock to the 9 o'clock position of the meter.

SUMMARY OF OPERATION

The detailed operation of the improvements of the present invention will be apparent to persons skilled in the art from the above description. However, below is an overview which will summarize those aspects of the invention as they relate to a continuous operation of the meter.

Seeds are continuously fed from the seed hopper 62 through the opening 39 in the horizontal mounting flange 38 of the seed meter housing; and these seeds are guided by the inclined lead-in chute 40 into the reservoir 46 defined by the seed meter housing 34 and by the rotating seed disc 45. The reservoir is further defined by the barrier brush 67 and the rigid retainer wall 85 of the lower seed holder insert 80. The barrier brush 67 prevents seeds from entering the discharge chute 41 in space between the rigid retainer wall 85 and the disc. An advantage of the barrier brush 67 is that the outer edge of the retainer wall 85 may be spaced inwardly of the disc 45 as indicated at 97 in FIG. 5. Such a spacing might be unacceptable without the presence of the barrier brush 67 because of the possibility that a seed would enter into the opening 97 and either be broken itself or damage the meter. The existence of the spacing 97, however, is advantageous in that the disc rotates at a high speed and will not scrape against or contact the rigid retainer wall 85.

Seeds in the reservoir 46 are further guided by the lower inclined wall 85C of the lower brush holder 80 toward the outer bottom or periphery of the housing side wall 35 and into the pinch space between the edge 85E of the lower brush holder and the rotating disc.

As the disc rotates at a high, generally constant angular velocity, the agitation grooves impart motion to those seeds contacting the inner surface of the disc. Initially, it is desired that seeds fall to the bottom of the reservoir and enter the seed cells 70 of the rotating disc and that they travel at the speed of the disc. In such a case, the progressively narrowing pinch space between the edge 85E of the inclined lower wall 85C and the disc will urge the seeds to move laterally into firm seating engagement with an associated cell. Such seeds will enter beneath retainer brush 65 and be delivered to the discharge chute without incident. If a cell is occupied however, a seed caught in the pinch space will be pinched upward and be free to re-circulate.

In the case where seeds are not immediately seated in a seed cell (for example at approximately the 6 o'clock, i.e., bottom, position as viewed in FIG. 3), the lead-in or agitation grooves not only impart motion to seeds they contact but because of their recessed shape, they will trap and carry along one or more seeds. However, these seeds will not be firmly entrenched in a groove and if there are a plurality of seeds in any of the lead-in grooves 71, when that groove encounters the isolation brush, the innermost seed closest to the center of the disc will, at first, be brushed out of the groove and returned to the reservoir. As the space between the isolation brush 66 and the periphery of the disc becomes progressively narrow while the disc continues to rotate, eventually some excess seeds will be dislodged from their associated lead-in grooves and some seeds will be forced past the isolation brush and will fall back to the reservoir. The brushing of seeds from the grooves will not occur, of course, unless the seed cell associated with that groove is occupied.

If there are seeds in a retention groove but no seed is seated in the associated seed cell, then the isolation brush 66 will force the seeds in the lead-in groove, guided by the groove itself, outwardly and into firm seating engagement in the associated seed cell before that seed cell enters beneath the retention brush 65. As seed sizes vary somewhat, there is a possibility that two smaller seeds may try to occupy the same cell and may be carried past point 65A of the retention brush. Should this occur, one seed becomes firmly located at the area 70 of the cell and the second seed is forced toward the center of the disc and partially into the agitation slot 71 or 72 associated with that cell. The width of the retainer brush 65 is controlled by the portion 78A of the upper brush holder 78 so as to retain only the one seed firmly in the pocket. The second seed, having no means of being retained, is free to fall to the reservoir 46 during the time the pocket passes from the 3 o'clock position to the 9 o'clock position of the meter.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In a seed meter for an agricultural planter having a housing receiving seeds from a storage hopper and at least partially defining a reservoir of seed, a disc mounted for rotation in a generally vertical plane and partially defining said reservoir of seeds, said disc having a plurality of seed cells, each cell sized to hold a seed, said cells being spaced about the periphery of the disc, and retainer means for retaining said seeds in said cells from a location at which the seed cells leave said reservoir to a location adjacent a discharge chute, the improvement comprising: a plurality of lead-in grooves formed in said disc, each lead-in groove communicating with a seed cell and having a depth less than the depth of a seed cell and adapted to engage seeds in said reservoir as said disc rotates to bring seeds up to the speed of the disc as it rotates through said reservoir of seeds, said lead-in grooves being further ,sized to capture partially at least one seed; and flexible isolator means mounted to said housing and extending along said disc adjacent said lead-in grooves to a location adjacent the area where said seed cells exit said seed reservoir for urging seeds in said lead-in grooves outwardly toward the seed cells associated with respective grooves as said grooves are rotated through said reservoir of seeds.

2. The apparatus of claim 1 wherein at least some of said lead-in grooves are constructed in length and arranged to capture partially a plurality of seeds and wherein said housing defines a generally cylindrical side wall cooperating with said disc in the area of said reservoir partially to define said seed cells and wherein said isolator means is elongated and extends from a location spaced inwardly from the periphery of said disc and progressively outwardly toward the periphery of said disc in the direction of rotation thereof, thereby extending progressively closer to said seed cells at a location where said seed cells exit said reservoir and begin engagement with said retainer means, whereby at least some of said grooves partially retain a plurality of seeds prior to leaving said reservoir of seeds and the innermost seeds in said grooves engage said isolator means first.

3. The apparatus of claim 1 wherein said isolator means comprises an elongated isolator brush mounted to said housing and extends in a direction relative to said rotating disc to define a progressively narrowing space between the side wall of said housing in the direction of rotation of said disc, such that if a seed cell is occupied and the associated lead-in groove contains one or more seeds, said seeds in said groove will be progressively removed from said groove by said isolator brush and returned to said reservoir or said seeds in said lead-in grooves may pass beneath said isolator brush and be free to fall back into said reservoir under gravity, and if said seed cell associated with said groove is not occupied, said isolator brush will urge said seeds progressively outwardly as said disc rotates and into seating engagement in an associated seed cell.

4. The apparatus of claim 3 further comprising a lower brush holder mounted to said housing and securing said isolator brush within said housing, said lower brush holder further defining a rigid barrier wall extending at least partially about the periphery of said housing adjacent the side wall thereof and spaced therefrom, and arranged to define said seed reservoir adjacent the inlet opening of said discharge chute to prevent seeds from entering said discharge chute, the height of said barrier wall being less than the width of said seed reservoir whereby the distal end of said barrier wall does not contact said rotating seed disc; and a barrier brush extending substantially the entire length of said barrier wall adjacent the inlet of said seed chute and cooperating with said barrier wall and said retention brush to prevent seeds from entering into the space between the distal edge of said barrier wall and said disc and between said barrier wall and said retention brush, whereby seeds from said seed cells are delivered reliably to said discharge chute while seeds from said reservoir are prevented from entering said discharge chute.

5. The apparatus of claim 4 wherein said lower brush holder further comprises a lower peripheral wall inclined outwardly and downwardly to facilitate the continuous delivery of seeds under gravity to the periphery of said disc, the outboard edge of said inclined peripheral wall adjacent said disc being spaced from said disc in one location in said reservoir to define a loading space between said outboard edge and said disc, said loading space being sized and arranged to trap at least partially seeds at the bottom of said reservoir and to urge said seeds into said seed cells as said disc rotates.

6. The apparatus of claim 5 characterized in that said loading space between said outboard edge of said inclined peripheral wall of said insert means and said disc becomes progressively narrower in the direction of rotation of said disc, thereby further to urge said seeds into seating engagement with an associated cell.

7. The apparatus of claim 1 wherein said retainer means comprises a retainer brush extending around the periphery of said disc and mounted to said housing adjacent said side wall thereof and extending from a location adjacent the downstream end of said isolator means to a location adjacent said seed chute.

8. The apparatus of claim 7 wherein said retainer means comprises a brush extending partially about the periphery of said disc and cooperating with said disc to retain said seeds in their respective cells from the location at which said cells leave said reservoir until said cells communicate with said discharge chute, and further comprising an upper brush holder for securing said retainer brush to said housing and defining an upper rigid wall spaced from said side wall of said housing and cooperating therewith to limit the effective width of said retainer brush relative to said cells such that if more than one seed is seated in a cell or in a lead-in groove adjacent a cell said retainer brush will be unable to retain more than said one seed in a cell.

9. The apparatus of claim 6 wherein said outboard edge of said inclined lower peripheral wall of said second insert defines a flat segment for enhancing contact with seeds at the bottom of said reservoir.

10. The apparatus of claim 1 wherein said lead-in grooves extend upstream in the direction of rotation of said disc as they extend inwardly whereby the leading edge of a groove precedes an associated seed cell in rotation and said disc is adapted for seeds having a larger mass such as soybeans.

11. The apparatus of claim 1 wherein said lead-in grooves extend inwardly and downwardly in the direction of rotation of said disc from an associated seed cell, whereby said disc is adapted for metering smaller and lighter seeds such as sorghum and milo.

12. In a seed meter for an agricultural planter having a housing receiving seeds from a storage hopper and at least partially defining a reservoir of seed, a disc mounted for rotation in a generally vertical plane and partially defining said reservoir of seeds, said disc having a plurality of seed cells, each cell sized to hold a seed, said cells being spaced about the periphery of the disc, and retainer means for retaining said seeds in said cells from a location at which the seeds leave said reservoir to a location adjacent a discharge chute, the improvement comprising: an isolator brush mounted to said housing and extending along said disc to a location adjacent the portion of said retainer means where said seed cells begin to pass beneath said retainer means and defining a progressively narrowing space between said isolator brush and the side wall of said housing for urging seeds outwardly of said disc and into the seed cells as said disc is rotated through said reservoir of seeds.

13. In a seed meter for an agricultural planter having a housing including a cylindrical side wall and receiving seeds from a storage hopper and at least partially defining a reservoir of seed, the combination comprising: a disc mounted for rotation in a generally vertical plane and partially defining said reservoir of seeds, said disc having a plurality of seed cells, each cell sized to hold a seed, said cells being spaced about the periphery of the disc, a retainer brush mounted to said housing for retaining said seeds in said cells from a location at which said cells leave said reservoir to a location adjacent a discharge chute, and a rigid brush holder mounted in said housing above said reservoir for securing said retainer brush to said housing and including a first rigid wall spaced inwardly from said side wall of said housing and cooperating therewith to limit the effective width of said retainer brush to be substantially equal to the width of said cells.

* * * * *